United States Patent
German et al.

(10) Patent No.: US 8,959,349 B2
(45) Date of Patent: Feb. 17, 2015

(54) METHOD AND APPARATUS FOR KEY SHARING OVER REMOTE DESKTOP PROTOCOL

(75) Inventors: Richard W. German, Carmel, IN (US); Tony E. Thompson, Leo, IN (US); Eric T. Marshall, Leo, IN (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 222 days.

(21) Appl. No.: 13/608,842

(22) Filed: Sep. 10, 2012

(65) Prior Publication Data

US 2013/0067229 A1    Mar. 14, 2013

Related U.S. Application Data

(60) Provisional application No. 61/533,001, filed on Sep. 9, 2011.

(51) Int. Cl.
*H04L 9/32*    (2006.01)
*H04L 9/08*    (2006.01)
*H04L 9/14*    (2006.01)
*H04L 29/06*   (2006.01)
*G06F 21/33*   (2013.01)

(52) U.S. Cl.
CPC .......... *H04L 9/0866* (2013.01); *H04L 9/0869* (2013.01); *H04L 9/14* (2013.01); *H04L 9/3226* (2013.01); *H04L 63/0815* (2013.01); *H04L 63/0846* (2013.01); *G06F 21/33* (2013.01); *H04L 2463/061* (2013.01); *G06F 2221/2107* (2013.01); *G06F 2221/2119* (2013.01)
USPC ............... 713/171; 713/184; 726/5; 709/203; 709/204

(58) Field of Classification Search
CPC .............. H04L 9/32; G06F 15/16; G06F 7/04
USPC ................ 713/171, 184; 709/203, 204; 726/5
See application file for complete search history.

(56) References Cited

U.S. PATENT DOCUMENTS

| 7,949,677 B2 | 5/2011 | Croft et al. | |
| 2006/0013393 A1 | 1/2006 | Ferchichi et al. | |
| 2011/0004649 A1* | 1/2011 | Nord et al. | 709/202 |
| 2011/0023096 A1* | 1/2011 | Xiao et al. | 726/5 |
| 2011/0055585 A1* | 3/2011 | Lee | 713/183 |

OTHER PUBLICATIONS

International Searching Authority, International Search Report and Written Opinion for International Application No. PCT/US2012/54488, Nov. 19, 2012, 9 pages, United States Patent and Trademark Office, USA.

* cited by examiner

*Primary Examiner* — Jeffrey Pwu
*Assistant Examiner* — Samuel Ambaye
(74) *Attorney, Agent, or Firm* — Kunzler Law Group

(57) ABSTRACT

Various methods for the secure exchange of private keys for authenticating a user to an RDP service are provided. One example method may comprise receiving a request comprising a session token to provide a user with access to an RDP service, and retrieving a username and password associated with the user using the session token. The method may further comprise assigning a time period of validity to the password. Furthermore, the method may comprise generating a first secret key based on user information, generating a second secret key based on the first secret key and a salt, and encrypting a packet comprising the password and the time period using the second secret key. Additionally, the method may comprise transmitting the username and encrypted packet to the device for authenticating the user with the requested RDP service. Similar and related example methods, apparatuses, systems, and computer program products are also provided.

18 Claims, 5 Drawing Sheets

METHOD AND APPARATUS FOR KEY SHARING OVER REMOTE DESKTOP PROTOCOL

CROSS-REFERENCE TO RELATED APPLICATIONS

This application claims priority under 35 USC 119 to U.S. Provisional Application No. 61/533,001 filed Sep. 9, 2011, which is incorporated by reference herein in its entirety.

TECHNICAL FIELD

Embodiments of the present invention relate generally to remote desktop technology, and, more particularly, relate to a method, apparatus, and computer program product for key sharing over remote desktop protocol.

BACKGROUND

The computing industry, over time, has experienced a rapid growth and evolution. Not only have technological advancements led to new models of computing devices, but they have also led to developments in the systems and networks in which the computing devices operate and interact. Each new model of computing device, from mainframes and supercomputers to personal computers and mobile devices, has brought its own share of advantages as well as challenges.

Over the past several decades, computing has been transitioning from distributed systems (e.g. mainframes) to decentralized systems (e.g. personal computers). While the new decentralized, client-oriented model provided enhanced flexibility and convenience to users, it also resulted in inefficient usage of resources and unnecessary additional costs. For example, each personal computer required the processing power and storage capacity necessary for maximum, rather than typical, loads. As a result, the recent trend in computing has been a return to a centralized model where applications and data can be centrally managed, stored, and provisioned for the purpose of reducing costs and improving security and efficiency.

One emerging model, known as "the cloud," relies on the delivery of computing resources via a computer network. Services provided by the cloud may range from individual applications to the full functionality of an operating system. To facilitate delivery of these cloud services, some systems may rely at least partially on remote access technologies, such as remote desktop protocol (RDP). RDP allows a user to view and control a remotely running desktop or application over a network connection. For security reasons, allowing remote control of remote desktops, applications, and even file systems, in many instances, needs to be limited to authorized users. Authenticating a user may require the use of encryption techniques that rely on private keys.

Therefore, a need exists in the art for allowing the secure exchange of private keys for authenticating a user to an RDP service.

SUMMARY

Methods, apparatuses, and computer program products are herein provided for the secure exchange of private keys for authenticating a user to remote access technology, such as an RDP service. Systems, methods, apparatuses, and computer program products in accordance with various embodiments may provide several advantages to computing devices, computing device users, and network providers. Various embodiments permit a user logged into a portal environment system, such as a desktop in a browser system, to exchange private keys with the portal environment system in order to obtain login information for authenticating a user to a requested RDP service. In these embodiments, the secure exchange of keys may permit the portal environment system to provide access to various RDP services through the implementation of a single sign-on system. Furthermore, various advantageous embodiments allow automatic login to the RDP service without additional user input. By providing a system for passing encrypted passwords to the RDP client, a user may not be required to remember and enter login information for every RDP service the user attempts to access.

Advantageous embodiments of the present invention further permit an administrator to limit the validity of a password for accessing a particular RDP service by associating a time period of validity with the password. In this way, the system may be less susceptible to attacks or unauthorized reuse of a password by using the time limitation on validity. In some embodiments, the server may provide both the RDP service executable and the encrypted password to the user's device allowing the user to access the executable using the password for only the time period specified. For example, if the time period were limited to one day, the user would not be able to login to the executable using the provided password after a day elapses. By specifically associating a time-limited password with a particular executable, in various advantageous embodiments, the administrator may transparently provide updated versions of the executable to the user when providing new passwords after a time limit expires. In this way, a user may benefit from software updates without expressly requesting them, while simultaneously being prevented from using outdated versions of an application.

In an example embodiment, a method is provided, which may comprise receiving a request from a device to provide a user with access to a remote desktop protocol service. The request may comprise a session token. The method of this example embodiment may further comprise retrieving a username and password associated with the user based on the session token. The username and password of this example method may be retrieved from a single sign-on repository. The method of this example embodiment may further comprise assigning a time period of validity to the password. Additionally, the method of this example embodiment may comprise generating a first secret key based at least in part on information associated with the user. The method of this example embodiment may further comprise generating a second secret key based at least in part on the first secret key and a salt. Furthermore, the method of this example embodiment may comprise encrypting a packet comprising the password and an indication of the time period using the second secret key. The method of this example embodiment may further comprise appending the unencrypted salt to the encrypted packet. Additionally, the method of this example embodiment may comprise providing for transmission of the username and encrypted packet to the device for authenticating the user with the requested remote desktop protocol service.

In another example embodiment, a method is provided, which may comprise providing for transmission of a request to provide a user with access to a remote desktop protocol service. The request may comprise a session token. The method of this example embodiment may further comprise receiving data related to accessing the remote desktop protocol service. The data may comprise a username, an encrypted packet, and information associated with a user. The encrypted packet may comprise a password and time period of validity for the password. The encrypted packet may further comprise an unencrypted indication of a salt. Additionally, the method of this example embodiment may comprise generating a first secret key based at least in part on the information associated with the user. The method of this example embodiment may further comprise generating a second secret key based at least in part on the first secret key and the salt. Furthermore, the method of this example embodiment may comprise decrypting the encrypted packet comprising the password and the time period of validity for the password using the second secret key. The method of this example embodiment may further comprise determining the current time. Additionally, the method of this example embodiment may comprise comparing the current time to the time period of validity for the password to determine whether the password is valid. The method of this example embodiment may further comprise providing for transmission of the username and decrypted password to the remote desktop protocol service in an instance in which the password is valid.

BRIEF DESCRIPTION OF THE DRAWING(S)

Having thus described some example embodiments of the invention in general terms, reference will now be made to the accompanying drawings, which are not necessarily drawn to scale, and wherein:

Figure 4:
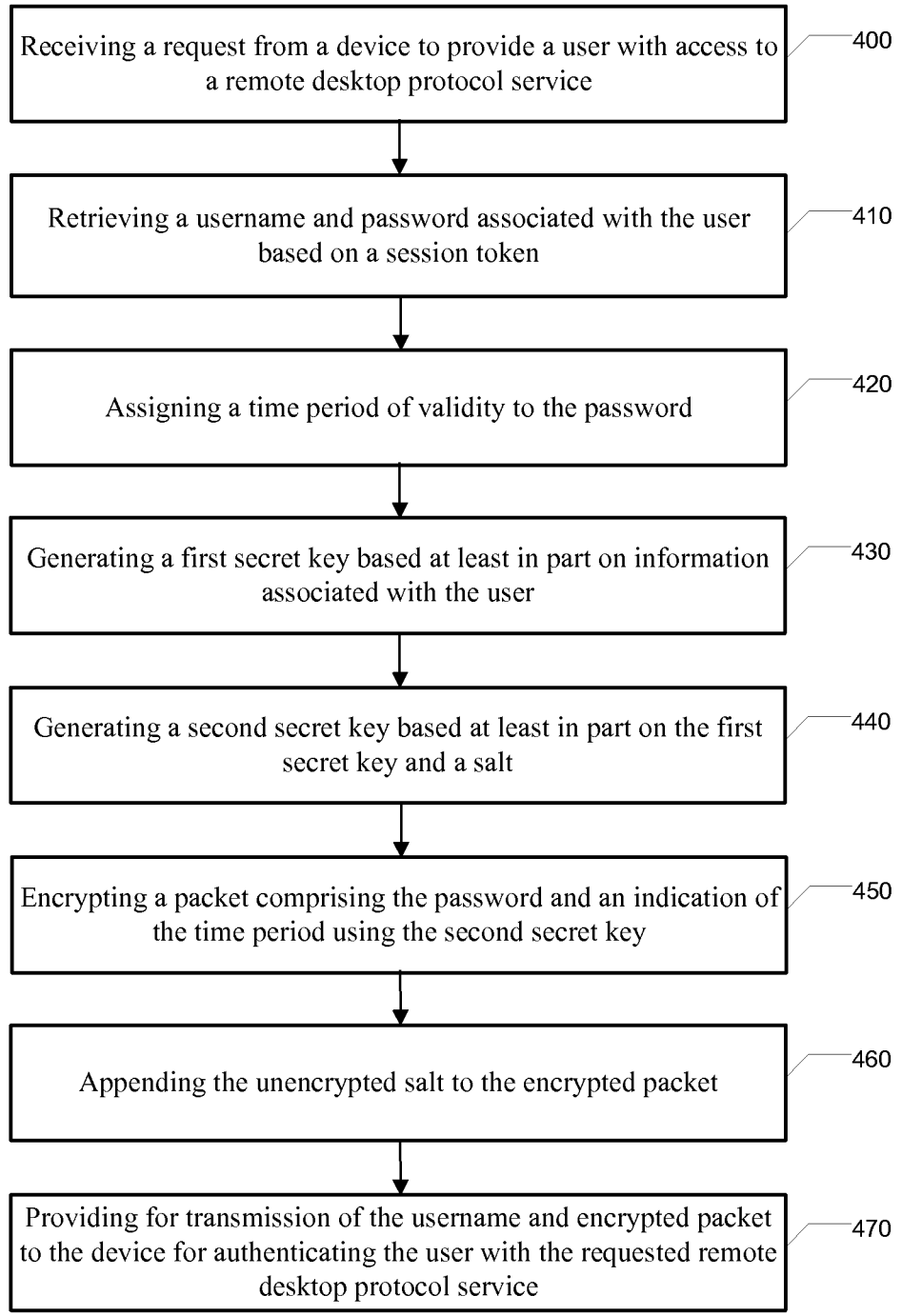
Figure 5:
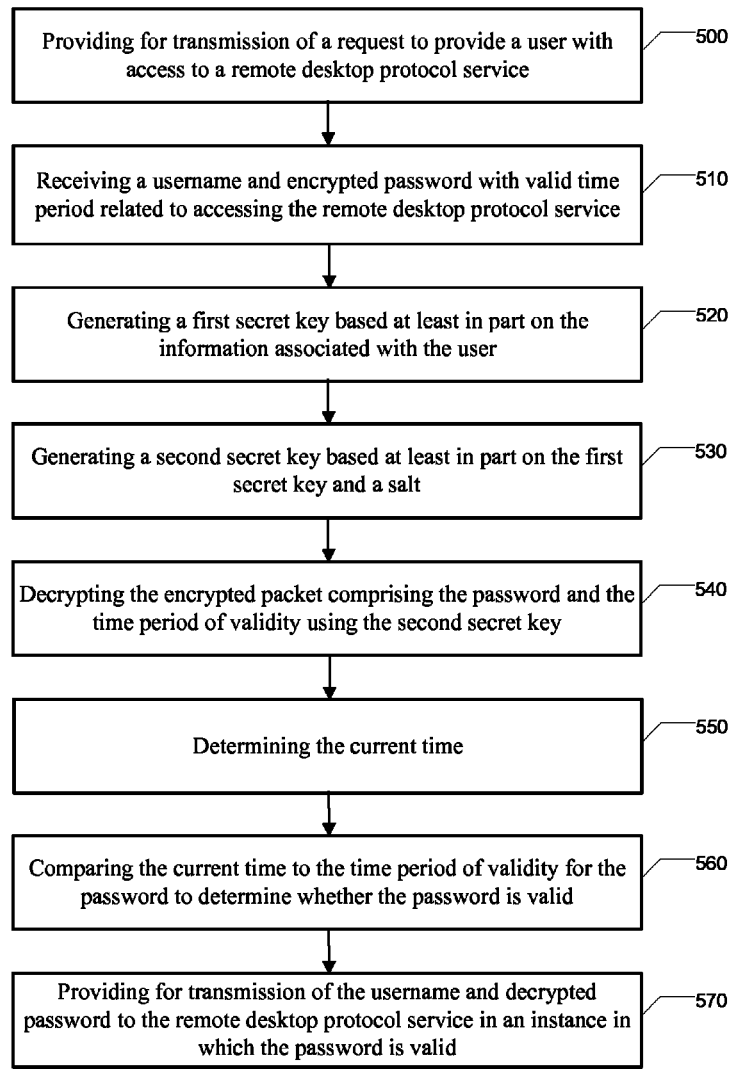

FIG. 4 illustrates a flowchart according to an example method for allowing the secure exchange of private keys for authenticating a user to an RDP service according to some example embodiments of the present invention; and FIG. 5 illustrates a flowchart according to an example method for allowing the secure exchange of private keys for authenticating a user to an RDP service according to some example embodiments of the present invention.

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

Definitions

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of computer-readable media include a floppy disk, a flexible disk, hard disk, magnetic tape, any other magnetic medium, a compact disc read only memory (CD-ROM), compact disc compact disc-rewritable (CD-RW), digital versatile disc (DVD), Blu-Ray, any other optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term 'circuitry' refers to all of the following: (a) hardware-only circuit implementations (such as implementations in only analog and/or digital circuitry); (b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a terminal apparatus, relay apparatus, or server, to perform various functions); and (c) circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, an integrated circuit in a terminal apparatus, relay apparatus, server, or other network device.

System

Figure 1:
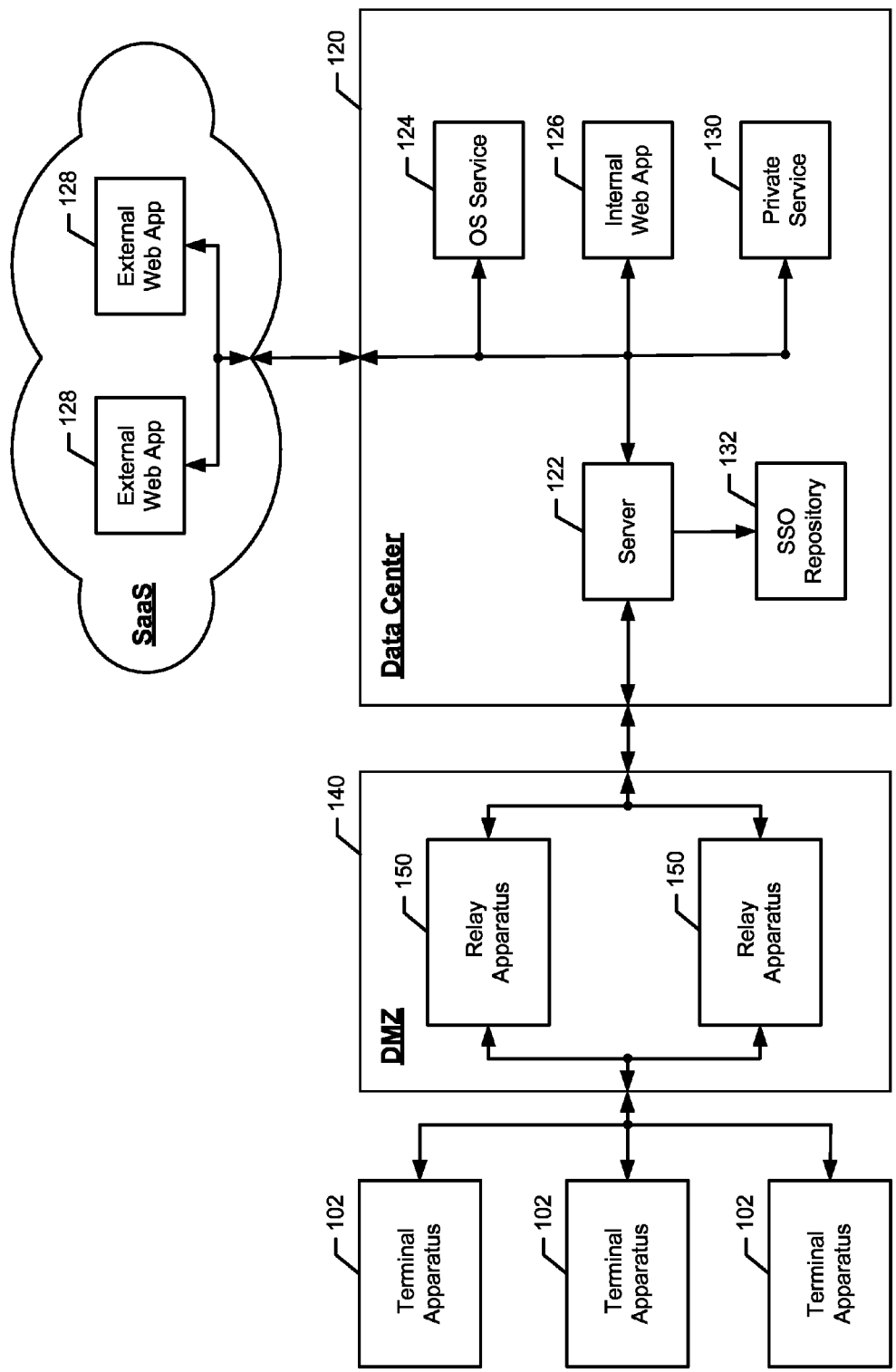
FIG. 1 illustrates a system for providing web-enabled delivery of a data center through a portal interface that would benefit from allowing the secure exchange of private keys for authenticating a user to an RDP service according to various embodiments of the present invention.

Referring now to FIG. 1, FIG. 1 illustrates a block diagram of an example system 100 for providing web-enabled delivery of a data center through a portal interface, such as a desktop built in a browser on a terminal apparatus 102, that would benefit from allowing the secure exchange of private keys for authenticating a user to an RDP service according to various embodiments of the present invention. It will be appreciated that the system 100 as well as the illustrations in other figures are each provided as an example of one embodiment and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for providing web-enabled delivery of a data center through a portal interface, numerous other configurations may also benefit from various embodiments of the present invention.

In example embodiments, the system 100 may comprise a data center 120. The data center 120 may be configured to operate as a private cloud, public cloud, or a combination private and public cloud. For example, a public cloud may provide services to any user, whereas a private cloud may provide services to a subset of all users (e.g., employees of a particular business enterprise providing the private cloud services). The data center 120 may, in some instances, be protected by a firewall. In some embodiments, the data center 120 may be located on an internal network such as a private local area network (LAN) or the like, or the data center 120 may be remotely located and/or hosted by a third party. In some instances, the data center 120 may comprise a combination of entities and services residing both locally and remotely.

According to some embodiments, the data center 120 may comprise one or more servers 122. A server 122 may be embodied as any computing device, or in some instances may be embodied as a virtual server. A server 122 may also be embodied as a combination of a plurality of computing devices. In this regard, the server 122 may be embodied, for example, as a server cluster and/or may be embodied as a distributed computing system, which may be distributed across a plurality of computing devices. In other embodiments, one or more servers 122 may be embodied on the same computing device.

According to various embodiments, the system 100 may comprise a demilitarized zone (DMZ) 140 located external to the data center 120. In this regard, the DMZ 140 may be located external to the firewall protecting the data center 120. In example embodiments, the DMZ 140 may comprise one or more relay apparatuses 150. A relay apparatus 150 may be embodied as any computing device, such as, for example, a server computer (e.g. a network web server), desktop computer, laptop computer, or the like. In other embodiments, a relay apparatus 150 may be embodied as a virtual relay. According to some embodiments, the relay apparatuses 150 in the DMZ 140 and the data center 120 may be embodied on the same computing device.

The system 100, according to example embodiments, may comprise one or more terminal apparatuses 102. In various embodiments, the one or more terminal apparatuses 102 may be located external to the DMZ 140 and the data center 120. In this regard, the one or more terminal apparatuses 102 may be located external to the firewall protecting the data center 120. A terminal apparatus 102 may be embodied as any computing device, such as, for example, a desktop computer, laptop computer, netbook, tablet, portable digital assistant (PDA), mobile terminal, mobile computer, mobile phone, mobile communication device, smart phone, game device, television device, digital video recorder, positioning device, any combination thereof, and/or the like.

In certain embodiments, a terminal apparatus 102 may be configured to establish a connection with at least one of the one or more relay apparatuses 150 in the DMZ 140. In some embodiments, a terminal apparatus 102 connected to a first relay apparatus 150 may be transferred to a second relay apparatus 150 during the same session. The connection may be established, for example, over the Internet via a transport protocol such as Transmission Control Protocol (TCP), User Datagram Protocol (UDP), or the like. In these embodiments, the connection may be established via an application-specific protocol such as Hypertext Transfer Protocol (HTTP), Hypertext Transfer Protocol Secure (HTTPS), or the like. The connection may be, in certain embodiments, a secure connection. For example, communication over the connection between the terminal apparatus 102 and the relay apparatus 150 may be secured using Transport Layer Security (TLS), Secure Sockets Layer (SSL), or the like. Data transmitted and received over the connection may be encrypted using, for example, 128 bit SSL encryption.

According to various embodiments, a relay apparatus 150 in the DMZ 140 may be configured to establish a connection with at least one of the one or more servers 122 in the data center 120. For example, a relay apparatus 150 may be configured to establish a pipeline connection with a server 122. The pipeline connection may be configured, in example embodiments, to provide bidirectional communication between the relay apparatus 150 and the server 122. For example, the pipeline connection may be a serial connection, Ethernet connection, socket connection, or the like. The pipeline connection may be, in some embodiments, made through one or more ports, for example through a single port in a firewall protecting the data center 120.

A relay apparatus 150, in example embodiments, may serve as an intermediary between one or more terminal apparatuses 102 and one or more servers 122. In this regard, the relay apparatus 150 may serve as a terminal end point for all communications and requests from the terminal apparatus 102 to the data center 120. The relay apparatus 150 may relay the communications and requests from the terminal apparatus 102 to the server 122. Similarly, the relay apparatus 150 may receive all communications to the terminal apparatus 102 originating from the data center 120 via the pipeline connection with the server 122 and relay the communications to the terminal apparatus 102 via the secure connection. In this regard, the server 122 may be configured to communicate with the applications, file systems, and databases inside the data center 120.

According to various embodiments, the combination of the relay apparatus 150 and the server 122 may provide a two-tier architecture for securing the data center 120 from external users, for example a user at a terminal apparatus 102. In this regard, the relay apparatus 150 may provide a first tier of security for the data center 120 while the server 122 may provide a second tier of security for the data center 120. In other embodiments, a terminal apparatus may be configured to connect directly to the server 122 thereby forming a single tier architecture.

According to various embodiments, the data center 120 may be configured to provide information and services to one or more terminal apparatuses 102 via the architecture described above. Examples of the information and services that may be provided by the data center 120, according to certain embodiments, are described in further detail below.

In some embodiments, the data center 120 may be configured to provide operating system specific services 124. For example, the data center 120 may provide Windows™ applications, such as Word™, Excel™, PowerPoint™, or the like. An operating system specific service 124, in certain embodiments, may be delivered by a publishing method. In this regard, the operating system specific service 124 may be remotely delivered from a terminal server (e.g. Microsoft® Terminal Server) running inside the data center 120. In other embodiments, an operating system specific service 124 may be delivered via an application virtualization method. In this regard, the operating system specific service 124 may be bundled in an executable file and deployed dynamically to a terminal apparatus 102 for local processing. In other embodiments, an operating system specific service 124 may refer to a service or application installed locally at the terminal apparatus and directed to be executed by the data center 120.

In example embodiments, the data center 120 may be configured to provide internally hosted web applications 126. In this regard, the internal web applications 126 may be natively integrated into the data center 120. For example, the internal web applications 126 may comprise web applications configured to run over HTTP, HTTPS, or another similar protocol, such as web servers (e.g. Apache, IIS), web portals (e.g. Microsoft SharePoint®, BEA Weblogic®, IBM Websphere®, Oracle PeopleSoft®, Oracle Financials®), content management systems, web consoles, and/or the like. In some embodiments, the internal web applications 126 may be developed in-house or may be developed by third party vendors.

According to various embodiments, the data center 120 may be configured to provide externally hosted web applications 128. The external web applications 128 may comprise, for example, Software as a Service (SaaS) applications. In certain embodiments, an external web application 128 may be hosted by a third party, for example at a remote data center. For example, the external web applications 128 may comprise applications offered by Salesforce.com™ Google Apps™ Microsoft Live™, Zoho™, Moodle™, and/or the like. An external web application 128 may be delivered to the data center 120 via a trusted connection, for example using Security Assertion Markup Language (SAML), delegated authentication, and/or the like. In this regard, the external web applications 128 may be integrated into the data center 120 for delivery to the terminal apparatuses 102 via the servers 122 and, in certain embodiments, relay apparatuses 150.

In some embodiments, the data center 120 may be configured to provide private services 130, such as cloud services. In this regard, the private services 130 may comprise file services, data services, or the like. The file services, in certain embodiments, may provide access to one or more network file systems, for example shared directories, home directories, public directories, and/or the like. The data services, in example embodiments, may provide access to one or more databases. The databases may in some instances be any Open Database Connectivity (ODBC) or Java Database Connectivity (JDBC) database, such as Microsoft SQL (Structured Query Language) Server®, MySQL™, Oracle Database®, IBM DB2®, Microsoft Access®, and/or the like. The databases may be accessible, for example, by web reporting, electronic web forms, and/or the like.

According to various embodiments, the information and services of the data center 120 may be presented to a user of a terminal apparatus 102 via a desktop built in a browser. In this regard, the terminal apparatus 102 may be configured to provide a user with access to a web-enabled browser, for example Microsoft Internet Explorer®, Mozilla Firefox®, Google Chrome®, Opera®, Apple Safari®, and/or the like. In example embodiments, the user may be able to access a desktop using the browser of the terminal apparatus 102. In example embodiments, the desktop may be built on web technologies (e.g. Ajax, Comet, and the like) and generated natively at the browser in the terminal apparatus 102. In this regard, the desktop built in a browser may have features similar to a traditional desktop, such as menus, taskbars, desktop icons and background, custom settings, shortcuts, system tray, and/or the like. The desktop provided in the browser may be distinct from a traditional desktop provided by the operating system running on the terminal apparatus 102. Additionally, the desktop built in a browser may be distinct from a virtual presentation of a traditional desktop running at an external location, such as inside the data center 120. In some embodiments, the information and services of the data center 120 may be presented to a user of a terminal apparatus 102 via other portal interfaces, for example, a dashboard, mobile interface, tablet interface, or any other portal interface designed to provide access to one or more data center 120 and/or cloud services. Services and information may, in certain embodiments, be delivered directly to a user without the use of a portal interface.

Terminal Apparatus

Figure 2:
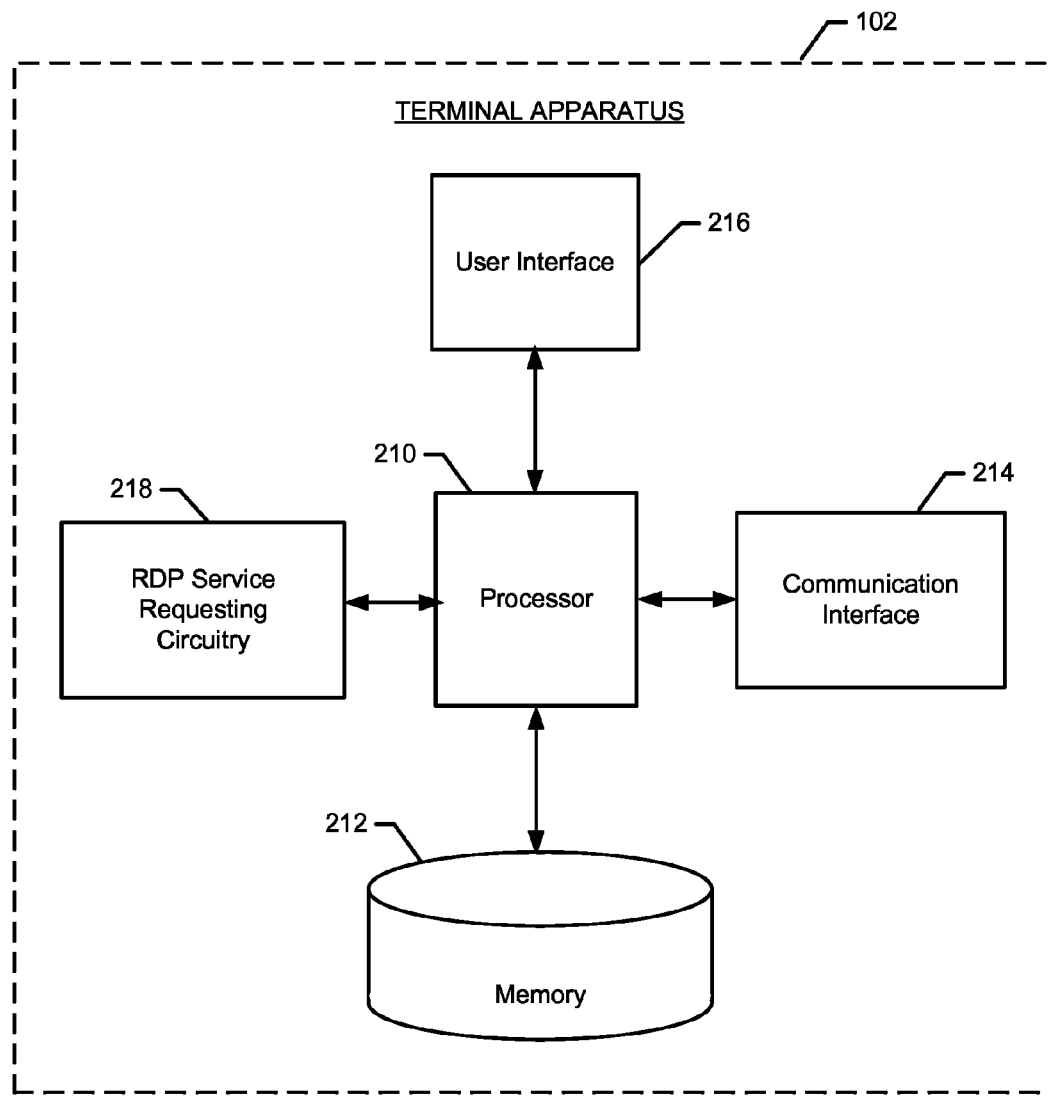
FIG. 2 illustrates a block diagram of a terminal apparatus according to some example embodiments of the present invention.

Referring now to FIG. 2, FIG. 2 illustrates a block diagram of a terminal apparatus 102 according to an example embodiment. In the example embodiment, the terminal apparatus 102 comprises various components for performing the various functions herein described including hosting a remote desktop client session. These components may comprise one or more of a processor 210, memory 212, communication interface 214, user interface 216, or RDP service requesting circuitry 218. The components of the terminal apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (for example memory 212) that is executable by a suitably configured processing device (e.g., the processor 210), or some combination thereof.

In some example embodiments, one or more of the components illustrated in FIG. 2 may be embodied as a chip or chip set. In other words, the terminal apparatus 102 may comprise one or more physical packages (for example, chips) including materials, components and/or wires on a structural assembly (for example, a baseboard). The structural assembly may provide physical strength, conservation of size, and/or limitation of electrical interaction for component circuitry comprised thereon. In this regard, the processor 210, memory 212, communication interface 214, user interface 216, and/or RDP service requesting circuitry 218 may be embodied as a chip or chip set. The terminal apparatus 102 may therefore, in some example embodiments, be configured to implement embodiments of the present invention on a single chip or as a single "system on a chip." As another example, in some example embodiments, the terminal apparatus 102 may comprise component(s) configured to implement embodiments of the present invention on a single chip or as a single "system on a chip." As such, in some cases, a chip or chipset may constitute components for performing one or more operations for providing the functionalities described herein and/or for enabling user interface navigation with respect to the functionalities and/or services described herein.

The processor 210 may, for example, be embodied as various components including one or more microprocessors, one or more processors, one or more coprocessors, one or more multi-core processors, one or more controllers, processing circuitry, one or more computers, various other processing elements including integrated circuits, or some combination thereof. Accordingly, although illustrated in FIG. 2 as a single processor, in some embodiments the processor 210 comprises a plurality of processors. The plurality of processors may be in operative communication with each other and may be collectively configured to perform one or more functionalities of the terminal apparatus 102 as described herein. The plurality of processors may be embodied on a single computing device or distributed across a plurality of computing devices collectively configured to function as the terminal apparatus 102. In some example embodiments, the processor 210 is configured to execute instructions stored in the memory 212 or otherwise accessible to the processor 210. These instructions, when executed by the processor 210, may cause the terminal apparatus 102 to perform one or more of the functionalities of the terminal apparatus 102 as described herein. As such, whether configured by hardware or software methods, or by a combination thereof, the processor 210 may comprise an entity capable of performing operations according to embodiments of the present invention while configured accordingly. Thus, for example, when the processor 210 is embodied as an executor of instructions, such as may be stored in the memory 212, the instructions may specifically configure the processor 210 to perform one or more algorithms and operations described herein.

The memory 212 may comprise, for example, volatile memory, non-volatile memory, or some combination thereof. In this regard, the memory 212 may comprise one or more tangible and/or non-transitory computer-readable storage media that may comprise volatile and/or non-volatile memory. Although illustrated in FIG. 2 as a single memory, the memory 212 may comprise a plurality of memories. The plurality of memories may be embodied on a single computing device or may be distributed across a plurality of computing devices collectively configured to function as the terminal apparatus 102. In various example embodiments, the memory 212 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 212 may be configured to store information, data, applications, instructions, or the like for enabling the terminal apparatus 102 to carry out various functions in accordance with various example embodiments. For example, in some example embodiments, the memory 212 is configured to buffer input data for processing by the processor 210. Additionally or alternatively, the memory 212 may be configured to store program instructions for execution by the processor 210. The memory 212 may store information in the form of static and/or dynamic information. This stored information may be stored and/or used by the RDP service requesting circuitry 218 during the course of performing its functionalities.

The communication interface 214 may be embodied as any device or component embodied in circuitry, hardware, a computer program product comprising computer readable program instructions stored on a computer readable medium (for example, the memory 212) and executed by a processing device (for example, the processor 210), or a combination thereof that is configured to receive and/or transmit data from/to another computing device. In an example embodiment, the communication interface 214 is at least partially embodied as or otherwise controlled by the processor 210. In this regard, the communication interface 214 may be in communication with the processor 210, such as via a bus. The communication interface 214 may comprise, for example, a network card (e.g. wired or wireless), an antenna, a transmitter, a receiver, and/or supporting hardware or software for enabling communications with one or more remote computing devices. The communication interface 214 may be configured to receive and/or transmit data using any protocol that may be used for communications between computing devices. In this regard, the communication interface 214 may be configured to receive and/or transmit data using any protocol that may be used for transmission of data over a wireless network, wireline network, some combination thereof, or the like by which the terminal apparatus 102 and one or more computing devices or computing resources may be in communication. As an example, the communication interface 214 may be configured to enable communication between the terminal apparatus 102 and another device, such as a relay apparatus 150 or a server 122. The communication interface 214 may additionally be in communication with the memory 212, user interface 216, and/or RDP service requesting circuitry 218, such as via a bus.

The user interface 216 may be in communication with the processor 210 to receive an indication of a user input and/or to provide an audible, visual, mechanical, or other output to a user. As such, the user interface 216 may comprise, for example, a keyboard, a mouse, a joystick, a display, a touch screen display, a microphone, a speaker, and/or other input/output mechanisms. In embodiments wherein the user interface 216 comprises a touch screen display, the user interface 216 may additionally be configured to detect and/or receive indication of a touch gesture or other input to the touch screen display. The user interface 216 may be in communication with the memory 212, communication interface 214, and/or RDP service requesting circuitry 218, such as via a bus.

The RDP service requesting circuitry 218 may be embodied as various components, such as circuitry, hardware, a computer program product comprising computer readable program instructions stored on a computer readable medium (for example, the memory 212) and executed by a processing device (for example, the processor 210), or some combination thereof and, in some embodiments, is embodied as or otherwise controlled by the processor 210. In embodiments wherein the RDP service requesting circuitry 218 is embodied separately from the processor 210, the RDP service requesting circuitry 218 may be in communication with the processor 210. The RDP service requesting circuitry 218 may further be in communication with one or more of the memory 212, communication interface 214, or user interface 216, such as via a bus.

The RDP service requesting circuitry 218 may be configured to perform or to cause to perform each of the steps related to the terminal apparatus 102 as described below in the RDP Encryption section.

Serving Network Apparatus

Figure 3:
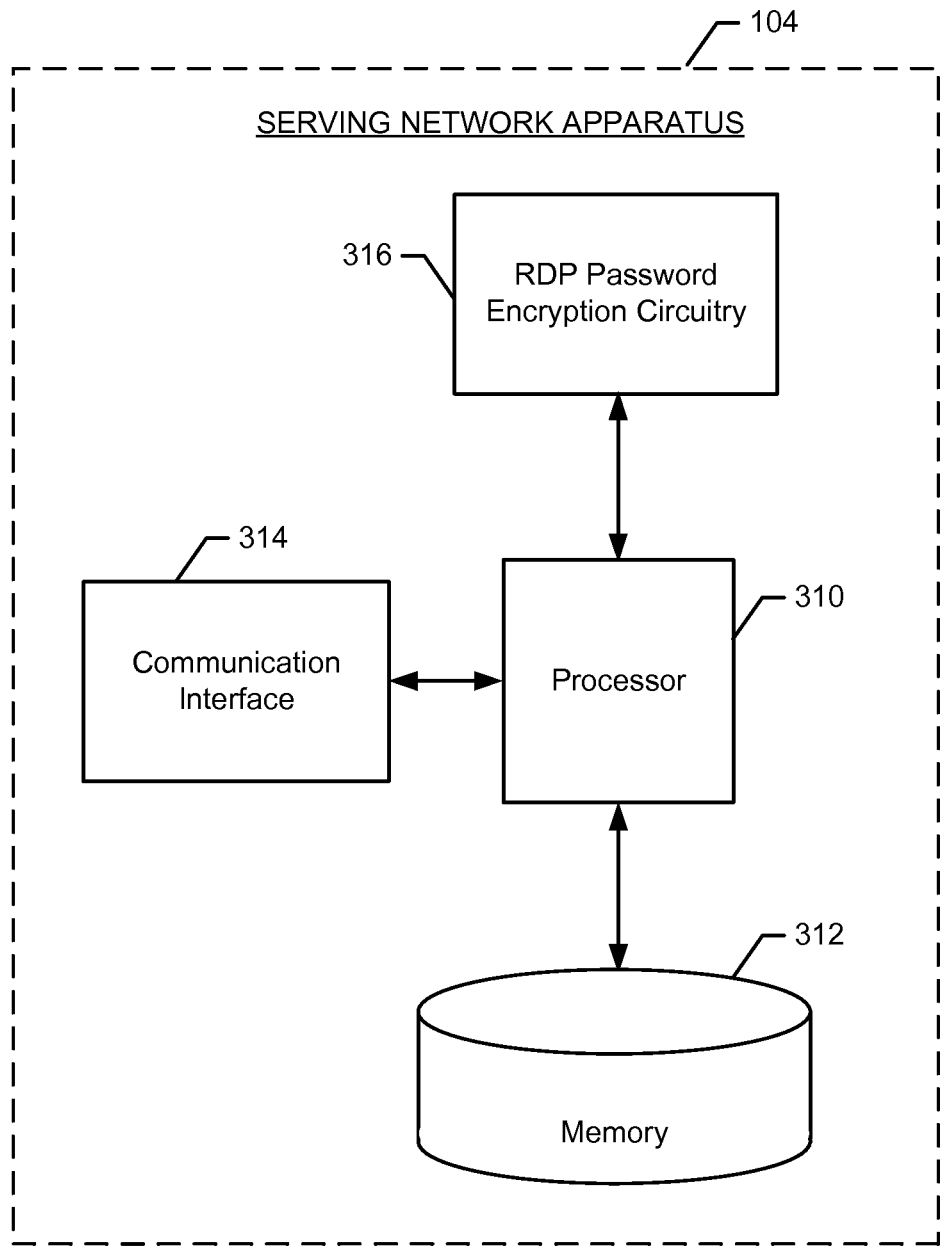
FIG. 3 illustrates a block diagram of a serving network apparatus according to some example embodiments of the present invention.

Referring now to FIG. 3, FIG. 3 illustrates a block diagram of a serving network apparatus 104 according to an example embodiment. In the example embodiment, the serving network apparatus 104 comprises various components for performing the various functions herein described. These components may comprise one or more of a processor 310, memory 312, communication interface 314, or RDP password encryption circuitry 316. The components of the serving network apparatus 104 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (for example memory 312) that is executable by a suitably configured processing device (e.g., the processor 310), or some combination thereof.

In some example embodiments, one or more of the components illustrated in FIG. 3 may be embodied as a chip or chip set. In other words, the serving network apparatus 104 may comprise one or more physical packages (for example, chips) including materials, components and/or wires on a structural assembly (for example, a baseboard). The structural assembly may provide physical strength, conservation of size, and/or limitation of electrical interaction for component circuitry comprised thereon. In this regard, the processor 310, memory 312, communication interface 314, and/or RDP password encryption circuitry 316 may be embodied as a chip or chip set. The serving network apparatus 104 may therefore, in some example embodiments, be configured to implement embodiments of the present invention on a single chip or as a single "system on a chip." As another example, in some example embodiments, the serving network apparatus 104 may comprise component(s) configured to implement embodiments of the present invention on a single chip or as a single "system on a chip." As such, in some cases, a chip or chipset may constitute components for performing one or more operations for providing the functionalities described herein.

The processor 310 may, for example, be embodied as various components including one or more microprocessors, one or more processors, one or more coprocessors, one or more multi-core processors, one or more controllers, processing circuitry, one or more computers, various other processing elements including integrated circuits, or some combination thereof. Accordingly, although illustrated in FIG. 3 as a single processor, in some embodiments the processor 310 comprises a plurality of processors. The plurality of processors may be in operative communication with each other and may be collectively configured to perform one or more functionalities of the serving network apparatus 104 as described herein. The plurality of processors may be embodied on a single computing device or distributed across a plurality of computing devices collectively configured to function as the serving network apparatus 104. In some example embodiments, the processor 310 is configured to execute instructions stored in the memory 312 or otherwise accessible to the processor 310. These instructions, when executed by the processor 310, may cause the serving network apparatus 104 to perform one or more of the functionalities of the serving network apparatus 104 as described herein. As such, whether configured by hardware or software methods, or by a combination thereof, the processor 310 may comprise an entity capable of performing operations according to embodiments of the present invention while configured accordingly. Thus, for example, when the processor 310 is embodied as an executor of instructions, such as may be stored in the memory 312, the instructions may specifically configure the processor 310 to perform one or more algorithms and operations described herein.

The memory 312 may comprise, for example, volatile memory, non-volatile memory, or some combination thereof. In this regard, the memory 312 may comprise one or more tangible and/or non-transitory computer-readable storage media that may comprise volatile and/or non-volatile memory. Although illustrated in FIG. 3 as a single memory, the memory 312 may comprise a plurality of memories. The plurality of memories may be embodied on a single computing device or may be distributed across a plurality of computing devices collectively configured to function as the serving network apparatus 104. In various example embodiments, the memory 312 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 312 may be configured to store information, data, applications, instructions, or the like for enabling the serving network apparatus 104 to carry out various functions in accordance with various example embodiments. For example, in some example embodiments, the memory 312 is configured to buffer input data for processing by the processor 310. Additionally or alternatively, the memory 312 may be configured to store program instructions for execution by the processor 310. The memory 312 may store information in the form of static and/or dynamic information. This stored information may be stored and/or used by the RDP password encryption circuitry 316 during the course of performing its functionalities.

The communication interface 314 may be embodied as any device or component embodied in circuitry, hardware, a computer program product comprising computer readable program instructions stored on a computer readable medium (for example, the memory 312) and executed by a processing device (for example, the processor 310), or a combination thereof that is configured to receive and/or transmit data from/to another computing device. In an example embodiment, the communication interface 314 is at least partially embodied as or otherwise controlled by the processor 310. In this regard, the communication interface 314 may be in communication with the processor 310, such as via a bus. The communication interface 314 may comprise, for example, a network card (e.g. wired or wireless), an antenna, a transmitter, a receiver, and/or supporting hardware or software for enabling communications with one or more remote computing devices. The communication interface 314 may be configured to receive and/or transmit data using any protocol that may be used for communications between computing devices. In this regard, the communication interface 314 may be configured to receive and/or transmit data using any protocol that may be used for transmission of data over a wireless network, wireline network, some combination thereof, or the like by which the serving network apparatus 104 and one or more computing devices or computing resources may be in communication. As an example, the communication interface 314 may be configured to enable communication between the serving network apparatus 104 and another device, such as a relay apparatus 150 or a terminal apparatus 102. The communication interface 314 may additionally be in communication with the memory 312 and/or RDP password encryption circuitry 316, such as via a bus.

The RDP password encryption circuitry 316 may be embodied as various components, such as circuitry, hardware, a computer program product comprising computer readable program instructions stored on a computer readable medium (for example, the memory 312) and executed by a processing device (for example, the processor 310), or some combination thereof and, in some embodiments, is embodied as or otherwise controlled by the processor 310. In embodiments wherein the RDP password encryption circuitry 316 is embodied separately from the processor 310, the RDP password encryption circuitry 316 may be in communication with the processor 310. The RDP password encryption circuitry 316 may further be in communication with one or more of the memory 312 and/or communication interface 314, such as via a bus. According to various embodiments, the RDP password encryption circuitry 316 may be associated with a serving network apparatus 104 embodied as a relay apparatus 150, server 122, or other network entity (e.g., a router or switch).

The RDP password encryption circuitry 316 may be configured to perform or to cause to perform each of the steps related to the serving network apparatus 104 as described below in the RDP Encryption section.

RDP Encryption

According to various embodiments, a user may wish to connect to a portal environment system via a terminal apparatus 102. In this regard, the terminal apparatus 102 may receive a request to access a particular portal environment system, such as a web based portal, to gain access to, for example, a data center. The portal interface may be, for example, a desktop in a browser (also known as web desktop or webtop), dashboard, mobile interface, tablet interface, or any other portal interface designed to provide access to one or more data center and/or cloud services. The portal environment system, in example embodiments, may provide one or more data center and/or cloud services via a remote desktop protocol (RDP) server, such as a terminal server. The RDP session may, in some instances, provide for delivery of a single service (e.g., an application) or, in other instances, provide for delivery of multiple services (e.g., remote desktop access).

In other embodiments, the terminal apparatus 102 may receive a request from a user to connect directly to an RDP server. In this regard, the user may request that a specific service or application be delivered to the terminal apparatus 102 via a server operating according to RDP, for example a terminal server. In various embodiments, the user may not be aware that the requested service is provided via an RDP server rather than locally by the terminal apparatus 102.

In some embodiments, the terminal apparatus 102 may access the portal environment system via a web browser. According to these embodiments, the user may request that the terminal apparatus 102 open a browser and navigate to a login page or home page for the portal environment system. In other embodiments, the terminal apparatus 102 may access the portal environment system without the use of a web browser. For clarity and simplicity purposes, the remainder of the disclosure will focus on embodiments in which the portal environment system is provided via a web browser, however, it should be understood that the invention may be embodied in many different forms and should not be construed as limited to the embodiments related to portal environment systems provided via a web browser set forth hereinafter.

In example embodiments, the portal environment system may be accessible by the terminal apparatus 102 via HTTP and/or HTTPS web pages. The login page of the portal environment system may request a username and password associated with the user. In certain embodiments, the user may input the username and password, and the terminal apparatus 102 may provide for transmission of the username and password to a serving network apparatus 104 (e.g., server 122) associated with the portal environment system, for example via relay apparatus 150. In other embodiments, the terminal apparatus 102 may transmit previously stored login information for the user to the portal environment system without requiring input from the user.

According to various embodiments, the serving network apparatus 104 may receive the login request and the user's username and password for logging into the portal environment system from the terminal apparatus 102. The serving network apparatus 104 may, in certain instances, authenticate the username and password of the user. In some embodiments, the serving network apparatus 104 may generate a session token associated with the user's portal environment system session. The session token may, for example, be a browser cookie or a unique byte code of a particular length, such as a string of N random characters. In this regard, the session token may uniquely identify the user, the terminal apparatus 102, and/or the portal environment system session.

According to example embodiments, the serving network apparatus 104 may provide for local storage of the session token. The serving network apparatus 104 may, in some embodiments, provide for transmission of a copy of the session token to the terminal apparatus 102. In example embodiments, the serving network apparatus 104 may cause installation of the session token at the terminal apparatus 102, for example as a cookie associated with the browser used to access the portal environment system on the terminal apparatus 102. The session token may permit the user at the terminal apparatus 102 to access the portal environment system, for example via the serving network apparatus 104.

In some embodiments, the portal environment system may be configured to operate according to a Single Sign-on (SSO) system. In this regard, once a user logs in to the portal environment system, the user may not be further prompted for a username or password in order to access one or more of the applications or services provided via the system. In this regard, the serving network apparatus 104 may be configured to access an SSO repository 132 to determine the appropriate username and password pair associated with the user for a requested application or service. In various embodiments, the serving network apparatus 104 may use a session token to facilitate SSO of a user, which will be described in further detail below.

In various embodiments, the portal environment system may comprise one or more applications and/or services provided via remote desktop protocol (RDP), for example services provided via a terminal server. According to example embodiments, the user at the terminal apparatus 102 may select one of the RDP applications or services from the portal environment system. For example, the user may select a link to a web service in the portal environment system that may be provided via the web browser using RDP. In example embodiments, the terminal apparatus 102 may transmit a request to the serving network apparatus 104 for the requested RDP application or service. The request may, in some instances, automatically include a copy of the session token. For example, the web browser may automatically pass a cookie to the serving network apparatus 104 along with the request.

According to example embodiments, the serving network apparatus 104 may receive the request for the RDP service along with the user's session token from the terminal apparatus 102. The serving network apparatus 104 may determine the portal environment session, terminal apparatus 102, and/or user associated with the session token. For example, the serving network apparatus 104 may perform a hash or lookup on the session token in a user or session database associated with the serving network apparatus 104.

In example embodiments, the serving network apparatus 104 may use the user information determined from the session token to look up a username and/or password associated with the user for the requested RDP service. For example, the serving network apparatus 104 may look up the username and/or password in the SSO repository 132 based on the determined user information. In other embodiments, the serving network apparatus 104 may directly retrieve the username and/or password from the SSO repository 132 using the session token or a function of the session token (e.g., a hash). The username and password for the RDP service may be the same as the username and password used to log in to the portal environment system or, in other embodiments, at least one of the username and password may be different. In some embodiments, the serving network apparatus 104 may first look up the username and then use the username to perform a second look up for the associated password. The password, in certain embodiments, may be unencrypted.

According to various embodiments, the serving network apparatus 104 may be configured to associate a time period of validity for the retrieved RDP service password. The time period may be defined, in some embodiments, by a start time and a stop time. For example, the serving network apparatus 104 may represent the start time with a first byte string (e.g., an eight byte string) and the stop time with a second byte string (e.g., another eight byte string). In other embodiments, the time period may be represented by a start time and duration. For example, the serving network apparatus 104 may represent the start time with a first byte string (e.g., an eight byte string) and the duration with a second byte string (e.g., a four byte string). The serving network apparatus 104 may, in example embodiments, indicate that there is no time period of validity. For example, the serving network apparatus 104 may indicate that the validity of the password does not expire. It should be understood that other methods for representing a time period may be used in place of the above example embodiments.

In example embodiments, the serving network apparatus 104 may be configured to encrypt the password and the time period. For example, the serving network apparatus 104 may combine the password and time period into a single packet and encrypt the packet. Various methods for encrypting the password and time period will now be described in the following example embodiments.

According to various embodiments, the serving network apparatus 104 may generate a first secret encryption key. The first secret encryption key may be generated based on information known and/or accessible to both the serving network apparatus 104 and the terminal apparatus 102. For example, the information used to generate the first secret encryption key may be based on a software license of the user and/or company associated with the terminal apparatus 102 used to access the RDP service or portal environment system. The information (e.g., software license) may be unique to the user and/or company. In other embodiments, the information used to generate the first secret key may be provided by the serving network apparatus 104 to the terminal apparatus 102 when the final encrypted packet is transmitted, which will be discussed in further detail below.

In example embodiments, the serving network apparatus 104 may generate or access a cryptographic salt or seed value. For example, the salt may be a byte string of random numbers and/or characters, such as an eight byte random numerical string. In some embodiments, the salt may be configured to change at a particular time interval or each time it is accessed. The serving network apparatus 104 may use the salt and the first secret encryption key to generate a second secret encryption key. In various embodiments, the serving network apparatus 104 may use the second secret encryption key to encrypt the password and time period. For example, the encrypted password may be in printable text format (i.e., non-binary), such as Base64 encoded. The serving network apparatus 104 may, in certain embodiments, append the salt to the encrypted password and time period in an unencrypted format.

According to various embodiments, the serving network apparatus 104 may provide for transmission of the retrieved username (in some instances unencrypted) as well as the encrypted password and time period to the terminal apparatus 102. For example, the unencrypted username and encrypted password and time period may be transmitted as parameters (e.g., applet parameters) in a web page (e.g., an HTML page) sent to the terminal apparatus 102. In certain embodiments, the serving network apparatus 104 may transmit this information to the terminal apparatus 102 over a secure connection, for example an SSL connection. The serving network apparatus 104 may also provide for transmission of the RDP service software to be executed by the terminal apparatus 102. For example, the serving network apparatus 104 may transmit a Java™ applet, in some instances in a Java™ Archive (JAR) file. In embodiments where the terminal apparatus 102 does not know or have access to the information required to generate the first secret encryption key, the serving network apparatus 104 may provide for transmission of the information (e.g., the software license).

In example embodiments, the terminal apparatus 102 may attempt to execute the RDP service software, which in some instances may have been provided by the serving network apparatus 104. The terminal apparatus 102 may generate the first secret encryption key using the information which may have been provided by the serving network apparatus 104 or which may have been previously known by the terminal apparatus 102. The terminal apparatus 102 and the serving network apparatus 104, in certain instances, may know in advance the process for generating the first secret encryption key. In these embodiments, a third party unaware of the process may not be able to generate the first encryption key even if the information used for generating the first secret encryption key provided by the serving network apparatus 104 is intercepted.

According to various embodiments, the terminal apparatus 102 may obtain the salt used to generate the second secret encryption key from the encrypted password and time period. In this regard, the terminal apparatus 102 may read the unencrypted salt appended to the encrypted password and time period. The terminal apparatus 102 may use the salt along with the generated first secret encrypted key to generate the second secret encryption key. Again, the terminal apparatus 102 and serving network apparatus 104 may know in advance the particular process for generating the second secret encryption key from the salt and the first secret encryption key. In some instances, the process may be a well-known encryption process. The terminal apparatus 102 may, in various embodiments, use the generated second secret encryption key to decrypt the password and time period.

In example embodiments, the terminal apparatus 102 may be configured to determine the validity of the password based on the time period. In this regard, the terminal apparatus 102 may obtain the current time and determine whether the current time falls between the start time and stop time or, in other embodiments, whether the current time falls within the range provided by the start time and the time duration. In embodiments in which the terminal apparatus 102 determines that the password is valid based on a comparison of the current time and the decrypted time period, the terminal apparatus 102 may attempt to pass the received username and decrypted password to the RDP service for authentication. According to certain embodiments, the username and password may be encrypted according to RDP prior to transmission for authentication. The serving network apparatus 104 and/or RDP server may receive the username and password and authenticate the user for the RDP service. In these embodiments, this process for SSO provided by the terminal apparatus 102 and serving network apparatus 104 may be transparent to the user.

In embodiments in which the terminal apparatus 102 determines that the password is invalid based on a comparison of the current time and the decrypted time period, the terminal apparatus 102 may not return the unencrypted password. For example, the terminal apparatus 102 may delete the password before it can be stored for future use. In this way, the terminal apparatus 102 may prevent the password from being revealed when it is invalid due to the current time not being within the assigned time period. In these embodiments, the RDP service executed by the terminal apparatus 102 may be terminated. In other embodiments, the RDP service may continue by prompting the user of the terminal apparatus 102 to manually enter a valid username and password for the RDP service without relying on SSO.

According to other embodiments of the present invention, various processes described above may be modified. In some embodiments, the username and password for accessing the RDP service may be universal. That is, the username and password may be the same for all users of the RDP service, the portal environment system, and/or any subgroup of the two. In some embodiments, the universal username and password may still be encrypted by the serving network apparatus 104 and transmitted to the terminal apparatus 102 for decryption as described in various embodiments above. The salt used to encrypt the password may, in example embodiments, remain static for an extended period of time (e.g., a year). In other embodiments, the username as well as the encrypted password, and in some instances time period, may be stored and provided to the terminal apparatus 102 without re-encrypting the password each time the RDP service is accessed. For example, the username and encrypted password may be hard coded into the parameters (e.g., applet parameters) of the web page (e.g., HTML page) sent to the terminal apparatus 102. The serving network apparatus 104 may, in some embodiments, transmit the username and unencrypted password to the terminal apparatus 102. In these embodiments, the terminal apparatus 102 may not be required to decrypt the password before providing the username and password to the RDP service for authentication. It should be noted that these modified embodiments may not provide the same level of security as some of the embodiments described above.

EXAMPLES

The following provides a non-limiting example of one embodiment and should not be construed to narrow the scope or spirit of the disclosure in any way. In this example, a user attempts to log in to a desktop in a browser portal system via a laptop. The user must enter a username and password for the portal system. The laptop sends the username and password to a server in the portal system. The portal system authenticates the username and password, associates a session token with the session, and returns the session token to the laptop. The portal system also provides access to the user's desktop via the desktop in a browser system.

In the example, the user attempts to open an RDP service while using the portal system. Without the user's knowledge, the laptop automatically sends the session token with the request for the RDP service. The server receives the request and session token, determines the user's identity, and looks up the user's username and password for the RDP service in an SSO repository 132. In this example, the user's username and password for the RDP service has previously been provided to the server to enable SSO, and the user's RDP service username and password is different from the user's portal system username and password. According to this example, the RDP service requires a license from the user, which is unique to the user's company. The server uses information from the license to generate a first key, obtains a salt value from a random generator, and uses the salt with the first key to generate a second key.

According to this example, the server decides to limit the validity of the password to one hour, so it creates a time period value specifying the current time as the start time and the duration to one hour. The server then encrypts the RDP service password it retrieved from the SSO repository 132 and the time period values using the second generated key to create an encrypted password packet. The server appends the unencrypted salt to the front of the encrypted password packet and enters it as well as the unencrypted username as applet parameters in an HTML web page to be returned to the laptop. The server transmits the web page, a JAR file containing an applet for running the requested RDP service, and a copy of the license used to generate the first key to the laptop.

The laptop of this example embodiment receives all of the information from the server without the user knowing. The laptop generates the first key using information from the received license, reads the salt from the front of the received encrypted password packet, generates the second key using the first key and the salt, and decrypts the encrypted password packet using the second key. The laptop then checks the current time to verify that it falls within the time period specified in the decrypted packet. In this example, less than a minute may have elapsed since the server created the encrypted packet, and therefore the laptop determines that the password is valid. The laptop retrieves the password from the decrypted packet and the username from the applet parameters, and the laptop attempts to execute the applet in the received JAR file. The laptop then transmits the username and password to the RDP server associated with the RDP service according to the RDP service's protocol. The RDP server authenticates the user and begins providing the RDP service. Again, from the user's perspective, the RDP service may have simply opened without further input in response to the user's selection of the service from the portal system.

In this example, the user may use the RDP service for several minutes and then close the service. Two hours later, the user attempts to access the RDP service again. In this case, the time period provided by the server for the password may have changed. Thus, when the laptop attempts to decrypt the password, the current time is outside of the time period of validity for the password. In this case, the laptop may still execute the applet in the JAR file, but without transmitting a username and password for the RDP service. The RDP service may then prompt the user to manually enter the username and password for the service before receiving access to the service.

FIG. 4 illustrates a flowchart according to an example method for allowing the secure exchange of private keys for authenticating a user to an RDP service according to an example embodiment. In this regard, FIG. 4 illustrates operations that may be performed at a serving network apparatus 104. The operations illustrated in and described with respect to FIG. 4 may, for example, be performed by, with the assistance of, and/or under the control of one or more of the processor 310, memory 312, communication interface 314, or RDP password encryption circuitry 316. Operation 400 may comprise receiving a request from a device to provide a user with access to a remote desktop protocol service. The request may comprise a session token. The processor 310, memory 312, communication interface 314, or RDP password encryption circuitry 316 may, for example, provide structure for performing operation 400. Operation 410 may comprise retrieving a username and password associated with the user based on the session token. The processor 310, memory 312, communication interface 314, or RDP password encryption circuitry 316 may, for example, provide structure for performing operation 410. Operation 420 may comprise assigning a time period of validity to the password. The processor 310, memory 312, communication interface 314, or RDP password encryption circuitry 316 may, for example, provide structure for performing operation 420. Operation 430 may comprise generating a first secret key based at least in part on information associated with the user. The processor 310, memory 312, communication interface 314, or RDP password encryption circuitry 316 may, for example, provide structure for performing operation 430. Operation 440 may comprise generating a second secret key based at least in part on the first secret key and a salt. The processor 310, memory 312, communication interface 314, or RDP password encryption circuitry 316 may, for example, provide structure for performing operation 440. Operation 450 may comprise encrypting a packet comprising the password and an indication of the time period using the second secret key. The processor 310, memory 312, communication interface 314, or RDP password encryption circuitry 316 may, for example, provide structure for performing operation 450. Operation 460 may comprise appending the unencrypted salt to the encrypted packet. The processor 310, memory 312, communication interface 314, or RDP password encryption circuitry 316 may, for example, provide structure for performing operation 460. Operation 470 may comprise providing for transmission of the username and encrypted packet to the device for authenticating the user with the requested remote desktop protocol service. The processor 310, memory 312, communication interface 314, or RDP password encryption circuitry 316 may, for example, provide structure for performing operation 470.

FIG. 5 illustrates a flowchart according to an example method for allowing the secure exchange of private keys for authenticating a user to an RDP service according to an example embodiment. In this regard, FIG. 5 illustrates operations that may be performed at a terminal apparatus 102. The operations illustrated in and described with respect to FIG. 5 may, for example, be performed by, with the assistance of, and/or under the control of one or more of the processor 210, memory 212, communication interface 214, user interface 216, or RDP service requesting circuitry 218. Operation 500 may comprise providing for transmission of a request to provide a user with access to a remote desktop protocol service. The request may comprise a session token. The processor 210, memory 212, communication interface 214, user interface 216, or RDP service requesting circuitry 218 may, for example, provide structure for performing operation 500. Operation 510 may comprise receiving data related to accessing the remote desktop protocol service. The data may comprise a username, an encrypted packet, and information associated with a user. The encrypted packet may comprise a password and time period of validity for the password. The encrypted packet may further comprise an unencrypted indication of a salt. The processor 210, memory 212, communication interface 214, user interface 216, or RDP service requesting circuitry 218 may, for example, provide structure for performing operation 510. Operation 520 may comprise generating a first secret key based at least in part on the information associated with the user. The processor 210, memory 212, communication interface 214, user interface 216, or RDP service requesting circuitry 218 may, for example, provide structure for performing operation 520. Operation 530 may comprise generating a second secret key based at least in part on the first secret key and the salt. The processor 210, memory 212, communication interface 214, user interface 216, or RDP service requesting circuitry 218 may, for example, provide structure for performing operation 530. Operation 540 may comprise decrypting the encrypted packet comprising the password and the time period of validity for the password using the second secret key. The processor 210, memory 212, communication interface 214, user interface 216, or RDP service requesting circuitry 218 may, for example, provide structure for performing operation 540. Operation 550 may comprise determining the current time. The processor 210, memory 212, communication interface 214, user interface 216, or RDP service requesting circuitry 218 may, for example, provide structure for performing operation 550. Operation 560 may comprise comparing the current time to the time period of validity for the password to determine whether the password is valid. The processor 210, memory 212, communication interface 214, user interface 216, or RDP service requesting circuitry 218 may, for example, provide structure for performing operation 560. Operation 570 may comprise providing for transmission of the username and decrypted password to the remote desktop protocol service in an instance in which the password is valid. The processor 210, memory 212, communication interface 214, user interface 216, or RDP service requesting circuitry 218 may, for example, provide structure for performing operation 570.

FIGS. 4 and 5 illustrate a flowchart of a system, method, and computer program product according to example embodiments of the invention. It will be understood that each block of the flowchart, and combinations of blocks in the flowchart, may be implemented by various means, such as hardware and/or a computer program product comprising one or more computer-readable mediums (as opposed to a computer-readable transmission medium which describes a propagating signal) having one or more computer program code instructions, program instructions, or executable computer-readable program code instructions stored therein. For example, one or more of the procedures described herein may be embodied by computer program instructions of a computer program product. In this regard, the computer program product(s) that embodies the procedures described herein may be stored by one or more memory devices (e.g., memory 212 or memory 312) of a terminal apparatus, server, relay apparatus, or other computing device (e.g., the terminal apparatus 102) and executed by a processor (e.g., the processor 210 or processor 310) in the computing device. In some embodiments, the computer program instructions comprising the computer program product(s) that embodies the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s).

Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together.

Accordingly, execution of instructions associated with the operations of the flowchart by a processor, or storage of instructions associated with the blocks or operations of the flowchart in a computer-readable storage medium, supports combinations of operations for performing the specified functions. It will also be understood that one or more operations of the flowchart, and combinations of blocks or operations in the flowchart, may be implemented by special purpose hardware-based computer systems and/or processors which perform the specified functions, or combinations of special purpose hardware and program code instructions.

The above described functions may be carried out in many ways. For example, any suitable means for carrying out each of the functions described above may be employed to carry out embodiments of the invention. In one embodiment, a suitably configured processor (for example, the processor 210, and/or processor 310) may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium (for example, the memory 212 and/or memory 312), and computer-readable program code portions, such as a series of computer instructions, embodied in the computer-readable storage medium.

In an example embodiment, a method is provided, which may comprise receiving a request from a device to provide a user with access to a remote desktop protocol service. The request may comprise a session token. The method of this example embodiment may further comprise retrieving a username and password associated with the user based on the session token. The username and password of this example method may be retrieved from a single sign-on repository. The method of this example embodiment may further comprise assigning a time period of validity to the password. Additionally, the method of this example embodiment may comprise generating a first secret key based at least in part on information associated with the user. The method of this example embodiment may further comprise generating a second secret key based at least in part on the first secret key and a salt. Furthermore, the method of this example embodiment may comprise encrypting a packet comprising the password and an indication of the time period using the second secret key. The method of this example embodiment may further comprise appending the unencrypted salt to the encrypted packet. Additionally, the method of this example embodiment may comprise providing for transmission of the username and encrypted packet to the device for authenticating the user with the requested remote desktop protocol service.

The method of this example embodiment may further comprise receiving a login request from a device to log in to a portal environment system. The login request of this example method may additionally comprise a session username and a session password associated with the user. Additionally, the method of this example embodiment may comprise authenticating the user to the portal environment system based at least in part on the session username and the session password. The method of this example embodiment may also comprise associating a session token with the user. Furthermore, the method of this example embodiment may comprise providing for transmission of the session token to the device. The remote desktop protocol service of this example method may be provided via the portal environment system. The salt of this example method may comprise a randomly generated string of characters. The time period of validity of this example method may comprise an indication of a start time and an indication of a stop time.

In another example embodiment, an apparatus comprising at least one processor and at least one memory storing computer program code is provided. The at least one memory and stored computer program code may be configured, with the at least one processor, to cause the apparatus of this example embodiment to at least receive a request from a device to provide a user with access to a remote desktop protocol service. The request may comprise a session token. The at least one memory and stored computer program code may be configured, with the at least one processor, to further cause the apparatus of this example embodiment to retrieve a username and password associated with the user based on the session token. The username and password of this example may be retrieved from a single sign-on repository. Additionally, the at least one memory and stored computer program code may be configured, with the at least one processor, to cause the apparatus of this example embodiment to assign a time period of validity to the password. The at least one memory and stored computer program code may be configured, with the at least one processor, to additionally cause the apparatus of this example embodiment to generate a first secret key based at least in part on information associated with the user. Furthermore, the at least one memory and stored computer program code may be configured, with the at least one processor, to cause the apparatus of this example embodiment to generate a second secret key based at least in part on the first secret key and a salt. The at least one memory and stored computer program code may be configured, with the at least one processor, to further cause the apparatus of this example embodiment to encrypt a packet comprising the password and an indication of the time period using the second secret key. Additionally, the at least one memory and stored computer program code may be configured, with the at least one processor, to further cause the apparatus of this example embodiment to append the unencrypted salt to the encrypted packet. The at least one memory and stored computer program code may be configured, with the at least one processor, to further cause the apparatus of this example embodiment to provide for transmission of the username and encrypted packet to the device for authenticating the user with the requested remote desktop protocol service.

The at least one memory and stored computer program code may be configured, with the at least one processor, to further cause the apparatus of this example embodiment to receive a login request from a device to log in to a portal environment system. The login request of this example may additionally comprise a session username and a session password associated with the user. Additionally, the at least one memory and stored computer program code may be configured, with the at least one processor, to cause the apparatus of this example embodiment to authenticate the user to the portal environment system based at least in part on the session username and the session password. The at least one memory and stored computer program code may be configured, with the at least one processor, to additionally cause the apparatus of this example embodiment to associate a session token with the user. Furthermore, the at least one memory and stored computer program code may be configured, with the at least one processor, to cause the apparatus of this example embodiment to provide for transmission of the session token to the device. The remote desktop protocol service of this example may be provided via the portal environment system. The salt of this example may comprise a randomly generated string of characters. The time period of validity of this example may comprise an indication of a start time and an indication of a stop time.

In another example embodiment, a computer program product is provided. The computer program product of this example embodiment may include at least one computer-readable storage medium having computer-readable program instructions stored therein. The program instructions of this example embodiment may comprise program instructions configured to receive a request from a device to provide a user with access to a remote desktop protocol service. The request may comprise a session token. The program instructions of this example embodiment may further comprise program instructions configured to retrieve a username and password associated with the user based on the session token. The username and password of this example may be retrieved from a single sign-on repository. Additionally, the program instructions of this example embodiment may comprise program instructions configured to assign a time period of validity to the password. The program instructions of this example embodiment may additionally comprise program instructions configured to generate a first secret key based at least in part on information associated with the user. Furthermore, the program instructions of this example embodiment may comprise program instructions configured to generate a second secret key based at least in part on the first secret key and a salt. The program instructions of this example embodiment may further comprise program instructions configured to encrypt a packet comprising the password and an indication of the time period using the second secret key. Additionally, the program instructions of this example embodiment may comprise program instructions configured to append the unencrypted salt to the encrypted packet. The program instructions of this example embodiment may additionally comprise program instructions configured to provide for transmission of the username and encrypted packet to the device for authenticating the user with the requested remote desktop protocol service.

The program instructions of this example embodiment may comprise program instructions configured to receive a login request from a device to log in to a portal environment system. The login request of this example may additionally comprise a session username and a session password associated with the user. Additionally, the program instructions of this example embodiment may comprise program instructions configured to authenticate the user to the portal environment system based at least in part on the session username and the session password. The program instructions of this example embodiment may further comprise program instructions configured to associate a session token with the user. Furthermore, the program instructions of this example embodiment may comprise program instructions configured to provide for transmission of the session token to the device. The remote desktop protocol service of this example may be provided via the portal environment system. The salt of this example may comprise a randomly generated string of characters. The time period of validity of this example may comprise an indication of a start time and an indication of a stop time.

In an example embodiment, an apparatus is provided, which may comprise means for receiving a request from a device to provide a user with access to a remote desktop protocol service. The request may comprise a session token. The apparatus of this example embodiment may further comprise means for retrieving a username and password associated with the user based on the session token. The username and password of this example apparatus may be retrieved from a single sign-on repository. The apparatus of this example embodiment may further comprise means for assigning a time period of validity to the password. Additionally, the apparatus of this example embodiment may comprise means for generating a first secret key based at least in part on information associated with the user. The apparatus of this example embodiment may further comprise means for generating a second secret key based at least in part on the first secret key and a salt. Furthermore, the apparatus of this example embodiment may comprise means for encrypting a packet comprising the password and an indication of the time period using the second secret key. The apparatus of this example embodiment may further comprise means for appending the unencrypted salt to the encrypted packet. Additionally, the apparatus of this example embodiment may comprise means for providing for transmission of the username and encrypted packet to the device for authenticating the user with the requested remote desktop protocol service.

The apparatus of this example embodiment may further comprise means for receiving a login request from a device to log in to a portal environment system. The login request of this example apparatus may additionally comprise a session username and a session password associated with the user. Additionally, the apparatus of this example embodiment may comprise means for authenticating the user to the portal environment system based at least in part on the session username and the session password. The apparatus of this example embodiment may also comprise means for associating a session token with the user. Furthermore, the apparatus of this example embodiment may comprise means for providing for transmission of the session token to the device. The remote desktop protocol service of this example apparatus may be provided via the portal environment system. The salt of this example apparatus may comprise a randomly generated string of characters. The time period of validity of this example apparatus may comprise an indication of a start time and an indication of a stop time.

In an example embodiment, a method is provided, which may comprise providing for transmission of a request to provide a user with access to a remote desktop protocol service. The request may comprise a session token. The method of this example embodiment may further comprise receiving data related to accessing the remote desktop protocol service. The data may comprise a username, an encrypted packet, and information associated with a user. The encrypted packet may comprise a password and time period of validity for the password. The encrypted packet may further comprise an unencrypted indication of a salt. Additionally, the method of this example embodiment may comprise generating a first secret key based at least in part on the information associated with the user. The method of this example embodiment may further comprise generating a second secret key based at least in part on the first secret key and the salt. Furthermore, the method of this example embodiment may comprise decrypting the encrypted packet comprising the password and the time period of validity for the password using the second secret key. The method of this example embodiment may further comprise determining the current time. Additionally, the method of this example embodiment may comprise comparing the current time to the time period of validity for the password to determine whether the password is valid. The method of this example embodiment may further comprise providing for transmission of the username and decrypted password to the remote desktop protocol service in an instance in which the password is valid.

The method of this example embodiment may further comprise providing for transmission of a request to log in to a portal environment system. Additionally, the method of this example embodiment may comprise receiving a session token associated with a session with the portal environment system. The session token may be associated with a portal environment system session. The remote desktop protocol service of this example method may be accessed via the portal environment system. The salt of this example method may comprise a randomly generated string of characters. The time period of validity of this example method may comprise an indication of a start time and an indication of a stop time.

In another example embodiment, an apparatus comprising at least one processor and at least one memory storing computer program code is provided. The at least one memory and stored computer program code may be configured, with the at least one processor, to cause the apparatus of this example embodiment to at least provide for transmission of a request to provide a user with access to a remote desktop protocol service. The request may comprise a session token. The at least one memory and stored computer program code may be configured, with the at least one processor, to further cause the apparatus of this example embodiment to receive data related to accessing the remote desktop protocol service. The data may comprise a username, an encrypted packet, and information associated with a user. The encrypted packet may comprise a password and time period of validity for the password. The encrypted packet may further comprise an unencrypted indication of a salt. The at least one memory and stored computer program code may be configured, with the at least one processor, to additionally cause the apparatus of this example embodiment to generate a first secret key based at least in part on the information associated with the user. Furthermore, the at least one memory and stored computer program code may be configured, with the at least one processor, to cause the apparatus of this example embodiment to generate a second secret key based at least in part on the first secret key and the salt. The at least one memory and stored computer program code may be configured, with the at least one processor, to further cause the apparatus of this example embodiment to decrypt the encrypted packet comprising the password and the time period of validity for the password using the second secret key. Additionally, the at least one memory and stored computer program code may be configured, with the at least one processor, to further cause the apparatus of this example embodiment to determine the current time. The at least one memory and stored computer program code may be configured, with the at least one processor, to further cause the apparatus of this example embodiment to compare the current time to the time period of validity for the password to determine whether the password is valid. The at least one memory and stored computer program code may be configured, with the at least one processor, to further cause the apparatus of this example embodiment to provide for transmission of the username and decrypted password to the remote desktop protocol service in an instance in which the password is valid.

The at least one memory and stored computer program code may be configured, with the at least one processor, to further cause the apparatus of this example embodiment to provide for transmission of a request to log in to a portal environment system. Additionally, the at least one memory and stored computer program code may be configured, with the at least one processor, to cause the apparatus of this example embodiment to receive a session token associated with a session with the portal environment system. The session token may be associated with a portal environment system session. The remote desktop protocol service of this example may be accessed via the portal environment system. The salt of this example may comprise a randomly generated string of characters. The time period of validity of this example may comprise an indication of a start time and an indication of a stop time.

In another example embodiment, a computer program product is provided. The computer program product of this example embodiment may include at least one computer-readable storage medium having computer-readable program instructions stored therein. The program instructions of this example embodiment may comprise program instructions configured to provide for transmission of a request to provide a user with access to a remote desktop protocol service. The request may comprise a session token. The program instructions of this example embodiment may further comprise program instructions configured to receive data related to accessing the remote desktop protocol service. The data may comprise a username, an encrypted packet, and information associated with a user. The encrypted packet may comprise a password and time period of validity for the password. The encrypted packet may further comprise an unencrypted indication of a salt. The program instructions of this example embodiment may additionally comprise program instructions configured to generate a first secret key based at least in part on the information associated with the user. Furthermore, the program instructions of this example embodiment may comprise program instructions configured to generate a second secret key based at least in part on the first secret key and the salt. The program instructions of this example embodiment may further comprise program instructions configured to decrypt the encrypted packet comprising the password and the time period of validity for the password using the second secret key. Additionally, the program instructions of this example embodiment may comprise program instructions configured to determine the current time. The program instructions of this example embodiment may additionally comprise program instructions configured to compare the current time to the time period of validity for the password to determine whether the password is valid. The program instructions of this example embodiment may further comprise program instructions configured to provide for transmission of the username and decrypted password to the remote desktop protocol service in an instance in which the password is valid.

The program instructions of this example embodiment may comprise program instructions configured to provide for transmission of a request to log in to a portal environment system. Additionally, the program instructions of this example embodiment may comprise program instructions configured to receive a session token associated with a session with the portal environment system. The session token may be associated with a portal environment system session. The remote desktop protocol service of this example may be accessed via the portal environment system. The salt of this example may comprise a randomly generated string of characters. The time period of validity of this example may comprise an indication of a start time and an indication of a stop time.

In an example embodiment, an apparatus is provided, which may comprise means for providing for transmission of a request to provide a user with access to a remote desktop protocol service. The request may comprise a session token. The apparatus of this example embodiment may further comprise means for receiving data related to accessing the remote desktop protocol service. The data may comprise a username, an encrypted packet, and information associated with a user. The encrypted packet may comprise a password and time period of validity for the password. The encrypted packet may further comprise an unencrypted indication of a salt. Additionally, the apparatus of this example embodiment may comprise means for generating a first secret key based at least in part on the information associated with the user. The apparatus of this example embodiment may further comprise means for generating a second secret key based at least in part on the first secret key and the salt. Furthermore, the apparatus of this example embodiment may comprise means for decrypting the encrypted packet comprising the password and the time period of validity for the password using the second secret key. The apparatus of this example embodiment may further comprise means for determining the current time. Additionally, the apparatus of this example embodiment may comprise means for comparing the current time to the time period of validity for the password to determine whether the password is valid. The apparatus of this example may further comprise means for providing for transmission of the username and decrypted password to the remote desktop protocol service in an instance in which the password is valid.

The apparatus of this example embodiment may further comprise means for providing for transmission of a request to log in to a portal environment system. Additionally, the apparatus of this example embodiment may comprise means for receiving a session token associated with a session with the portal environment system. The session token may be associated with a portal environment system session. The remote desktop protocol service of this example apparatus may be accessed via the portal environment system. The salt of this example apparatus may comprise a randomly generated string of characters. The time period of validity of this example apparatus may comprise an indication of a start time and an indication of a stop time.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

The invention claimed is:

1. A method for key sharing for allowing remote desktop access to a service by a client, the method comprising:
    receiving a request from a terminal apparatus to provide a user with access to a remote desktop service, wherein the request comprises a session token;
    retrieving a license, a username, and a password associated with the user based on the session token;
    assigning a time period of validity to the password;
    generating a first secret key from the license;
    generating a second secret key from the first secret key and a salt;
    encrypting a packet comprising the password and the time period of validity using the second secret key;
    appending the unencrypted salt, a web page with the username entered as a web page parameter, and a Java Archive (JAR) file comprising an applet for running the remote desktop service to the encrypted packet to form an appended packet; and
    transmitting the appended packet to the terminal apparatus for authenticating the user for accessing the requested remote desktop service.

2. A method for key sharing for allowing remote desktop access to a service by a client as defined in claim 1, wherein the step of retrieving the license, the username, and the password further comprises retrieving the license, the username, and the password from a single sign-on repository.

3. A method for key sharing for allowing remote desktop access to a service by a client as defined in claim 1, wherein the step of receiving a request from the terminal apparatus further comprises receiving a session username and a session password associated with the user.

4. A method for key sharing for allowing remote desktop access to a service by a client as defined in claim 3, wherein the session token is based at least in part on the session username and the session password.

5. A method for key sharing for allowing remote desktop access to a service by a client as defined in claim 1, wherein the salt comprises a randomly generated string of characters.

6. A method for key sharing for allowing remote desktop access to a service by a client as defined in claim 1, wherein the time period of validity comprises an indication of a start time and an indication of a stop time.

7. An apparatus for key sharing for allowing remote desktop access to a service by a client, the apparatus comprising:
    at least one processor; and at least one memory storing computer program code, wherein the at least one memory and stored computer program code are configured, with the at least one processor, to cause the apparatus to,
    receive a request from a terminal apparatus to provide a user with access to a remote desktop service, wherein the request comprises a session token;
    retrieve a license, a username, and a password associated with the user based on the session token;
    assign a time period of validity to the password;
    generate a first secret key from the license;
    generate a second secret key from the first secret key and a salt;
    encrypt a packet comprising the password and the time period of validity using the second secret key;
    append the unencrypted salt, a web page with the username entered as a web page parameter, and a Java Archive (JAR) file comprising an applet for running the remote desktop service to the encrypted packet to form an appended packet;
    transmit the appended packet to the terminal apparatus for authenticating the user for accessing the requested remote desktop service.

8. An apparatus for key sharing for allowing remote desktop access to a service by a client as defined in claim 7, further comprising a single sign-on repository from which the license, the username, and the password are retrieved.

9. An apparatus for key sharing for allowing remote desktop access to a service by a client as defined in claim 7, wherein the request from the terminal apparatus further comprises a session username and a session password associated with the user.

10. An apparatus for key sharing for allowing remote desktop access to a service by a client as defined in claim 9, wherein the session token is based at least in part on the session username and the session password.

11. An apparatus for key sharing for allowing remote desktop access to a service by a client as defined in claim 7, wherein the salt comprises a randomly generated string of characters.

12. An apparatus for key sharing for allowing remote desktop access to a service by a client as defined in claim 7, wherein the time period of validity comprises an indication of a start time and an indication of a stop time.

13. A computer program product for key sharing for allowing remote desktop access to a service by a client, the computer program product comprising:

at least one non-transitory computer-readable storage medium having computer-readable program instructions stored therein, wherein the program instructions are configured to;

receive a request from a terminal apparatus to provide a user with access to a remote desktop service, wherein the request comprises a session token;

retrieve a license, a username, and a password associated with the user based on the session token;

assign a time period of validity to the password;

generate a first secret key from the license;

generate a second secret key from the first secret key and a salt;

encrypt a packet comprising the password and the time period of validity using the second secret key;

append the unencrypted salt, a web page with the username entered as a web page parameter, and a Java Archive (JAR) file comprising an applet for running the remote desktop service to the encrypted packet to form appended packet;

transmit the appended packet to the terminal apparatus for authenticating the user for accessing the requested remote desktop service.

14. A computer program product for key sharing for allowing remote desktop access to a service by a client as defined in claim 13, further comprising a single sign-on repository from which the license, the username, an the password are retrieved.

15. A computer program product for key sharing for allowing remote desktop access to a service by a client as defined in claim 13, wherein the request from the terminal apparatus further comprises a session username and a session password associated with the user.

16. A computer program product for key sharing for allowing remote desktop access to a service by a client as defined in claim 15, wherein the session token is based at least in part on the session username and the session password.

17. A computer program product for key sharing for allowing remote desktop access to a service by a client as defined in claim 13, wherein the salt comprises a randomly generated string of characters.

18. A computer program product for key sharing for allowing remote desktop access to a service by a client as defined in claim 13, wherein the time period of validity comprises an indication of a start time and an indication of a stop time.

* * * * *